(12) United States Patent
Jinbo

(10) Patent No.: US 10,047,796 B2
(45) Date of Patent: Aug. 14, 2018

(54) ROLLING BEARING

(71) Applicant: JTEKT CORPORATION, Osaka-shi, Osaka (JP)

(72) Inventor: Tomohiko Jinbo, Kashiwara (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 15/464,654

(22) Filed: Mar. 21, 2017

(65) Prior Publication Data

US 2017/0284467 A1 Oct. 5, 2017

(30) Foreign Application Priority Data

Apr. 4, 2016 (JP) .................................. 2016-075143

(51) Int. Cl.
*F16C 33/58* (2006.01)
*F16C 19/06* (2006.01)

(52) U.S. Cl.
CPC ............ *F16C 33/586* (2013.01); *F16C 19/06* (2013.01)

(58) Field of Classification Search
CPC .............................. F16C 33/583; F16C 33/586
See application file for complete search history.

(56) References Cited

U.S. PATENT DOCUMENTS

| | | | | |
|---|---|---|---|---|
| 3,588,205 A | * | 6/1971 | Daugherty | F16C 27/04 384/473 |
| 3,619,017 A | * | 11/1971 | Robinson | F16C 19/163 384/513 |
| 4,509,871 A | * | 4/1985 | Herzog | F16C 19/166 384/502 |
| 4,548,518 A | * | 10/1985 | Ravinale | D01H 7/56 384/469 |
| 5,310,268 A | * | 5/1994 | Schlereth | F16C 19/184 384/512 |
| 8,596,876 B2 | * | 12/2013 | Olschewski | F16C 19/28 384/569 |
| 2010/0158424 A1 | * | 6/2010 | Muramatsu | F16C 35/067 384/548 |

FOREIGN PATENT DOCUMENTS

| | | | | |
|---|---|---|---|---|
| FR | 3020420 A1 | * | 10/2015 | ............ F16C 35/063 |
| JP | 2006-322579 A | | 11/2006 | |

* cited by examiner

*Primary Examiner* — Thomas R Hannon
(74) *Attorney, Agent, or Firm* — Oliff PLC

(57) ABSTRACT

In a rolling bearing in which one of inner and outer rings is a rotary ring and the other is a stationary ring, a fitting surface of the stationary ring fitted to a mating member is formed in first and second partial peripheral surfaces of a radially outer surface of the stationary ring which faces the mating member. The first partial peripheral surface is formed on one side in the axial direction, and the second partial peripheral surface is formed on the other side in the axial direction with respect to the first partial peripheral surface. An annular groove that restrains creep is formed between the first partial peripheral surface and the second partial peripheral surface. The annular groove has a depth that is large enough not to allow the bottom of the annular groove to contact the mating member when a radial static rated load is applied.

4 Claims, 7 Drawing Sheets

ROLLING BEARING

INCORPORATION BY REFERENCE

The disclosure of Japanese Patent Application No. 2016-075143 filed on Apr. 4, 2016 including the specification, drawings and abstract, is incorporated herein by reference in its entirety.

BACKGROUND OF THE INVENTION

1. Field of the Invention

The present invention relates to rolling bearings.

2. Description of the Related Art

Many rolling bearings are used in various industrial apparatuses. Rolling bearings include an inner ring, an outer ring, a plurality of rolling elements, and a cage. The rolling elements are interposed between the inner ring and the outer ring. The cage holds the rolling elements. For example, as shown in FIG. 7, in a rolling bearing 90 that supports a rotary shaft 95 in a housing 97, an inner ring 91 is fitted on the rotary shaft 95, and an outer ring 92 is fitted to an inner peripheral surface 98 of the housing 97.

In particular, in the case where the rolling bearing 90 is a deep groove ball bearing that is subjected to an axial load in one direction, the inner ring 91 is interference fitted on the rotary shaft 95. On the other hand, the outer ring 92 is often clearance fitted in the housing 97. Accordingly, when the rolling bearing 90 is in use with the rotary shaft 95 rotating, creep (circumferential slipping of the outer ring 92 relative to the housing 97) tends to occur between the outer ring 92 and the housing 97. If creep occurs, for example, the outer ring 92 may damage the housing 97.

As a solution, the rolling bearing 90 is proposed in which an annular groove 93 that restrains creep is formed in an outer peripheral surface 92b of the outer ring 92 (see Japanese Patent Application Publication No. 2006-322579 (JP 2006-322579 A)). This rolling bearing 90 can restrain creep that tends to occur when the rolling bearing 90 is subjected to a large radial load (load in the radial direction). Creep that tends to occur when the rolling bearing 90 is subjected to such a load is such creep that the outer ring 92 slowly slips in the same direction as the rotational direction of the rolling bearing 90.

Such creep can be considered to occur by the following mechanism. When the rolling bearing 90 is subjected to a large radial load, each ball 94 is subjected to the large load and rolls along an outer ring raceway groove 96. At this time, the outer periphery of the outer ring 92 located immediately under the ball 94 is partially elastically deformed. Since each ball 94 rolls along the outer ring raceway groove 96, this causes pulsating deformation (pulsating displacement) of the outer ring 92. This results in relative slipping between the outer ring 92 and the housing 97 due to the elastic deformation of the contact region of the outer ring 92 with the housing 97 (in the case where the annular groove 93 is not formed). This relative slipping is considered to cause such creep in which the outer ring 92 slowly slips in the same direction as the rotational direction of the rolling bearing 90.

Accordingly, such relative slipping is restrained by forming the annular groove 93 in the outer ring 92, whereby creep is restrained. This annular groove 93 is formed based on the fact that the rolling bearing 90 is subjected to a large radial force that causes creep. However, creep need be effectively restrained even when the rolling bearing is subjected to a load containing an axial component as well as a radial load.

SUMMARY OF THE INVENTION

It is one object of the present invention to provide a rolling bearing that effectively restrains creep even when the rolling bearing is subjected to a load containing an axial component as well as a radial load.

According to one aspect of the present invention, a rolling bearing includes: an inner ring; an outer ring; a plurality of rolling elements that are interposed between the inner ring and the outer ring; and a cage that holds the plurality of rolling elements. One of the inner ring and the outer ring is a rotary ring and the other is a stationary ring. A fitting surface of the stationary ring fitted to a mating member is formed in first and second partial peripheral surfaces of a radially outer surface of the stationary ring which faces the mating member, the first partial peripheral surface being formed on one side in an axial direction and the second partial peripheral surface being formed on the other side in the axial direction with respect to the first partial peripheral surface. An annular groove that restrains creep is formed between the first partial peripheral surface and the second partial peripheral surface. The annular groove has a depth that is large enough not to allow a bottom of the annular groove to contact the mating member when a radial static rated load is applied.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
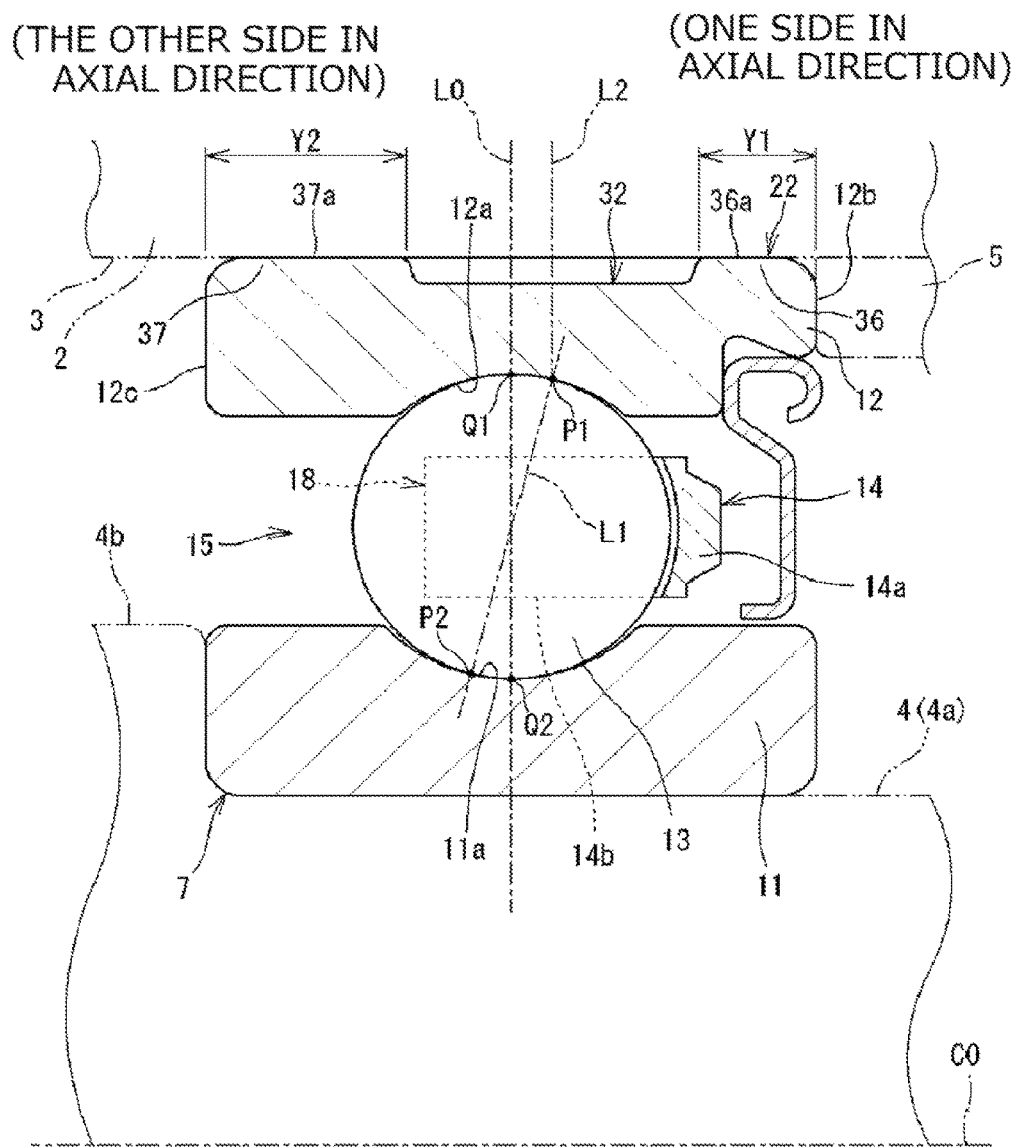
FIG. 1 is a sectional view showing an example of a rolling bearing of the present invention.

An embodiment of the present invention will be described with reference to the accompanying drawings. FIG. 1 is a sectional view showing an example of a rolling bearing of the present invention. In FIG. 1, a rolling bearing 7 is disposed in a rotary device having a housing 2 and a rotary shaft 4 and supports the rotary shaft 4 so that the rotary shaft 4 can rotate relative to the housing 2. The rotary shaft 4 has a smaller diameter shaft portion 4a and a larger diameter shaft portion 4b. The rolling bearing 7 is fitted on the smaller diameter shaft portion 4a. The larger diameter shaft portion 4b has a larger outside diameter than the smaller diameter shaft portion 4a. An inner ring 11 of the rolling bearing 7 is in contact with the larger diameter shaft portion 4b in the axial direction. An annular portion 5 is formed on one side in the axial direction of an inner peripheral surface 3 of the housing 2 (hereinafter also referred to as the "housing inner peripheral surface 3"). An outer ring 12 of the rolling bearing 7 is in contact with the annular portion 5 in the axial direction.

The rolling bearing 7 includes the inner ring 11, the outer ring 12, a plurality of rolling elements, and an annular cage 14. The inner ring 11 is fitted on the rotary shaft 4. The outer ring 12 is attached to the housing inner peripheral surface 3. The rolling elements are interposed between the inner ring 11 and the outer ring 12. The cage 14 holds the rolling elements. The rolling elements of the present embodiment are balls 13. The rolling bearing 7 shown in FIG. 1 is a deep groove ball bearing.

The annular portion 5 of the housing 2 presses the outer ring 12 from the one side in the axial direction toward the other side in the axial direction. The larger diameter shaft portion 4b of the rotary shaft 4 presses the inner ring 11 from the other side in the axial direction toward the one side in the axial direction. The housing 2 and the rotary shaft 4 have the annular portion 5 and the larger diameter shaft portion 4b, respectively, and the rolling bearing 7 is thus under an axial load (preload).

In the present embodiment, the inner ring 11 is interference fitted on the rotary shaft 4. The inner ring 11 is fitted on the rotary shaft 4 so as to be in close contact with the rotary shaft 4, and can rotate with the rotary shaft 4. The outer ring 12 is attached to the housing 2 that is stationary. The outer ring 12 is clearance fitted to the housing inner peripheral surface 3. Accordingly, when the rotary device is in use with the rotary shaft 4 rotating together with the inner ring 11, creep (circumferential slipping of the outer ring 12 relative to the housing 2) may occur between the outer ring 12 and the housing 2. Creep will be described later.

The inner ring 11 has in its outer peripheral surface an inner ring raceway groove (raceway surface) 11a in which the balls 13 roll, and the outer ring 12 has in its inner peripheral surface an outer ring raceway groove (raceway surface) 12a in which the balls 13 roll. The plurality of balls 13 are disposed in an annular space 15 between the inner ring 11 and the outer ring 12. When the rolling bearing 7 rotates (the inner ring 11 rotates), the balls 13 held by the cage 14 roll in the inner ring raceway groove 11a and the outer ring raceway groove 12a.

The cage 14 can hold the plurality of balls 13 at predetermined intervals (regular intervals) in the circumferential direction. The cage 14 thus has a plurality of pockets 18 arranged in the circumferential direction so as to accommodate the balls 13 therein. The cage 14 of the present embodiment has a ring portion 14a and a plurality of cage bars 14b. The ring portion 14a is located on the one side in the axial direction of the balls 13. The cage bars 14b extend from the ring portion 14a toward the other side in the axial direction. The space located on the other side in the axial direction of the ring portion 14a and formed between each pair of cage bars 14b, 14b adjacent to each other in the circumferential direction serves as a pocket 18. The cage 14 may be in other forms. For example, the cage 14 may have another ring portion on the other side in the axial direction.

In the rolling bearing 7 of the present embodiment, the outer ring 12 serving as a stationary ring is attached to the housing 2 (the mating member). The outer peripheral surface of the outer ring 12 serves as a fitting surface 22 with respect to the housing 2 (the inner peripheral surface 3). An annular groove 32 is formed in the fitting surface 22. The annular groove 32 is an annular recess that is continuous in the circumferential direction. The sectional shape of the annular groove 32 does not vary in the circumferential direction. That is, the annular groove 32 has the same sectional shape in the circumferential direction. The annular groove 32 is formed in the fitting surface 22 at a position offset from the middle in the axial direction of the fitting surface 22 toward the one side in the axial direction. The position of the annular groove 32 will also be described later.

The annular groove 32 is formed in the fitting surface 22. The outer ring 12 has cylindrical portions 36, 37 on both sides in the axial direction of the annular groove 32. Outer peripheral surfaces 36a, 37a of the cylindrical portions 36, 37 are cylindrical surfaces about a bearing central axis C0 of the rolling bearing 7 and can contact the housing 2 (the inner peripheral surface 3). As shown in FIG. 1, in the section including the bearing central axis C0, the outer peripheral surfaces 36a, 37a of the cylindrical portions 36, 37 have a linear sectional shape parallel to the bearing central axis C0. The annular groove 32 is formed in the fitting surface 22 at a position offset toward the one side in the axial direction. The cylindrical portion 36 (cylindrical outer peripheral surface 36a) on the one side in the axial direction of the annular groove 32 is therefore shorter in the axial direction than the cylindrical portion 37 (cylindrical outer peripheral surface 37a) on the other side in the axial direction of the annular groove 32 (Y1<Y2).

As described above, the rolling bearing 7 is under an axial preload. That is, the rolling bearing 7 is subjected to an axial load as well as a radial load. Accordingly, each ball 13 contacts the outer ring 12 at a point P1 in the outer ring raceway groove 12a, which is located on the one side in the axial direction of the deepest point Q1 in the outer ring raceway groove 12a. Each ball 13 also contacts the inner ring 11 at a point P2 in the inner ring raceway groove 11a, which is located on the other side in the axial direction of the deepest point Q2 in the inner ring raceway groove 11a. In the section shown in FIG. 1, a straight line L1 connecting the points P1, P2, i.e., the contact points of the ball 13 with the outer ring 12 and the inner ring 11, is tilted with respect to a centerline L0 extending in the radial direction. That is, the rolling bearing 7 is subjected to a combined radial and axial load. The direction in which the ball 13 contacts the outer ring 12 and the inner ring 11 due to this combined radial and axial load is therefore the direction of the straight line L1 tilted with respect to the centerline L0 extending in the radial direction.

The centerline L0 extending in the radial direction is a straight line passing through the center of the ball 13. In the present embodiment, the distance from the centerline L0 to a side surface 12b on the one side in the axial direction of the outer ring 12 is the same as that from the centerline L0 to a side surface 12c on the other side in the axial direction of the outer ring 12. That is, the centerline L0 is the centerline (L0) of the outer ring 12. In the present embodiment, the centerline L0 is also the centerline of the rolling bearing 7.

Figure 2:
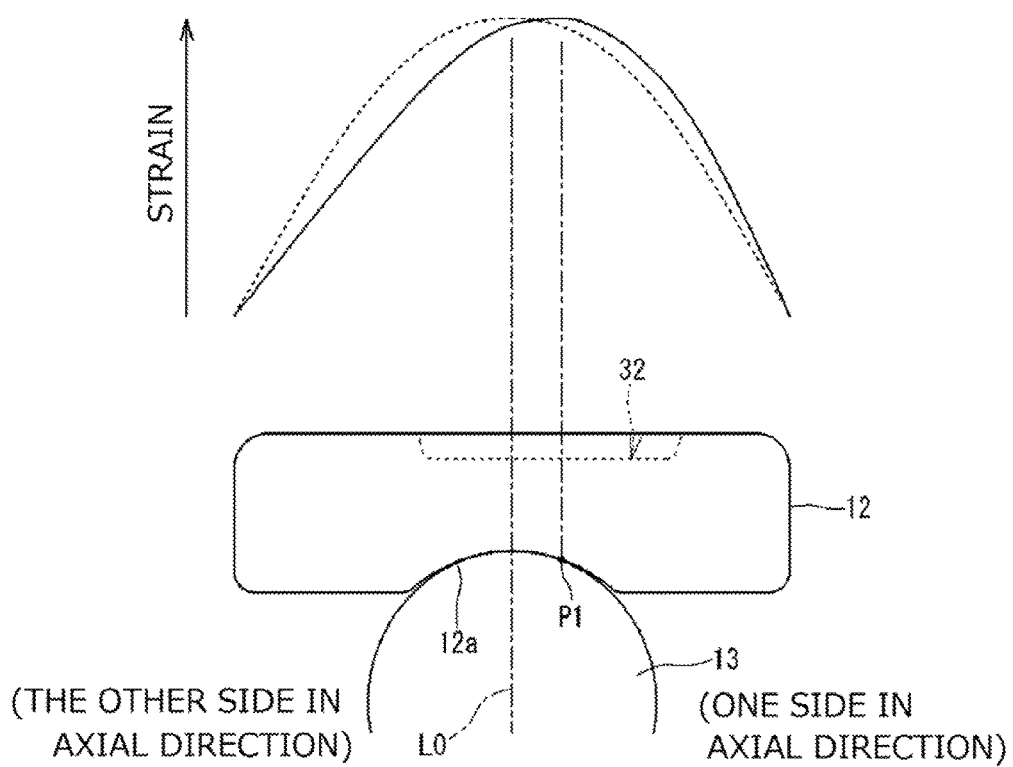
FIG. 2 is an illustration showing strain distribution in an outer ring in the case where the outer ring is subjected to a load.

FIG. 2 is an illustration showing strain distribution in the outer ring 12 in the case where the outer ring 12 is subjected to a load. Dashed line in FIG. 2 shows strain distribution in the case where the outer ring 12 is subjected only to a radial load. Continuous line in FIG. 2 shows strain distribution in the case where the outer ring 12 is subjected to a combined load (radial load and axial load). As shown in FIG. 2, in the case where the outer ring 12 is subjected to an axial load as well as a radial load, the ball 13 contacts the outer ring raceway groove 12a at the point P1 located on the one side in the axial direction of the centerline L0 of the outer ring 12. In this case, the axial position in the outer ring 12 where strain is the largest is shifted toward the one side in the axial direction from the position on the centerline L0. The annular groove 32 is therefore formed at a position shifted toward the one side in the axial direction so as to correspond to the position in the outer ring 12 where strain is the largest. In FIG. 2, the annular groove 32 is shown by hidden outline (dotted line).

The shape of the annular groove 32 and the axial position thereof will further be described. In the section shown in FIG. 1, a straight line (L2) extending in the radial direction is the centerline L2 of the annular groove 32. The annular groove 32 has a recessed section and has a symmetrical shape (line symmetry) on the one side in the axial direction and the other side in the axial direction with respect to the centerline L2. The annular groove 32 is formed so that the centerline L2 of the annular groove 32 is located on the contact point (P1, the contact point of the ball 13 with the outer ring raceway groove 12a) side of the centerline L0 of the outer ring 12. In particular, in the case of FIG. 1, the annular groove 32 is formed so that the contact point (P1) of the ball 13 with the outer ring raceway groove 12a is located on the centerline L2 of the annular groove 32.

In FIG. 1 etc., the annular groove 32 is shown to have a great depth for the ease of explanation of its shape. However, the actual depth of the annular groove 32 is much smaller than the thickness of the outer ring 12. For example, the annular groove 32 may have a depth of less than 1 mm.

Creep that occurs between the housing 2 and the outer ring 12 will be described. There are the following three types of creep that can occur in the rolling bearing 7. In the present embodiment, the "bearing rotational direction" refers to the rotational direction of the inner ring 11 serving as a rotary ring.

First creep: the outer ring 12 slips slowly in the same direction as the bearing rotational direction.
Second creep: the outer ring 12 slips fast in the same direction as the bearing rotational direction.
Third creep: the outer ring 12 slips in the opposite direction to the bearing rotational direction.

The first creep tends to occur when the rolling bearing 7 is subjected to a large radial load (load in the radial direction). The first creep is considered to occur by the following mechanism. When the rolling bearing 7 is subjected to a large radial load, each ball 13 is subjected to the large load and rolls along the outer ring raceway groove 12a. At this time, the outer periphery of the outer ring 12 located immediately under the ball 13 is partially elastically deformed. The rolling bearing 7 is subjected to an axial load as well as the large radial load. Since the rolling bearing 7 is subjected to a combined radial and axial load in the direction of the straight line L1, the outer ring 12 is elastically deformed so as to have the largest strain in a portion immediately under (radially outside) the point P1. Since each ball 13 rolls along the outer ring raceway groove 12a, this causes pulsating deformation (pulsating displacement) of the outer ring 12. This results in relative slipping between the outer ring 12 and the housing 2 due to the elastic deformation of the contact region of the outer ring 12 with the housing 2. This relative slipping is considered to cause the first creep.

In the second creep, the direction in which the outer ring 12 moves (slips) is the same as that in the first creep. However, the second creep tends to occur when the rolling bearing 7 is under no load. When the rolling bearing 7 is under no load, the rotation of the inner ring 11 also causes the outer ring 12 to rotate. This is considered to cause the second creep.

In the third creep, the direction in which the outer ring 12 moves (slips) is opposite to that in the first creep and the second creep. For example, the third creep is considered to occur as the radial load serving as an offset load causes the outer ring 12 to whirl along the housing inner peripheral surface 3.

In the rolling bearing 7 of the present embodiment, in order to restrain the first creep, the annular groove 32 is formed in the fitting surface 22 of the outer ring 12 at a position radially outside the outer ring raceway groove 12a. Since the outer ring 12 has the annular groove 32 in the fitting surface 22 on the housing 2, such relative slipping due to elastic deformation as described above regarding the mechanism of the first creep can be restrained. The first creep can thus be restrained. When the rolling bearing 7 is under a combined load including a large radial load, a region of the outer ring 12 which is located radially outside the point P1 of the outer ring raceway groove 12a is elastically deformed (increased in diameter) (see FIG. 2). However, since the outer ring 12 has the annular groove 32 in this region, the elastic deformation (increase in diameter) can be caused mainly within the annular groove 32. This can reduce a direct contact area between the elastically deformed portion and the housing inner peripheral surface 3. Accordingly, the elastic deformation is not (hardly) transmitted to the housing 2, which restrains the first creep between the outer ring 12 and the housing 2. The annular groove 32 therefore serves as a groove (clearance groove) that restrains the first creep.

In the present embodiment, the annular groove 32 is formed in the fitting surface 22 at a position offset from the middle in the axial direction of the fitting surface 22 (the centerline L0 of the outer ring 12) toward the one side in the axial direction. That is, the annular groove 32 is formed at a positon offset toward the one side in the axial direction so that, when each ball 13 rolls on the outer ring 12, the area of the outer periphery of the outer ring 12 in which the largest strain is applied comes to the middle of the annular groove 32 (see FIG. 2).

As described above, in the rolling bearing 7 of the present embodiment, the outer ring 12 serving as a stationary ring is fitted in the housing 2 (the mating member), and the annular groove 32 that restrains creep is formed in the fitting surface 22 on the housing 2 so that the centerline L2 of the annular groove 32 (the middle of the groove) is shifted in the axial direction from the centerline L0 of the rolling bearing 7 (the middle of the bearing). In particular, when in use, the rolling bearing 7 shown in FIG. 1 is under an axial preload as an axial load from the one side in the axial direction toward the other side in the axial direction is applied to the outer ring 12. The annular groove 32 is therefore formed so that the middle of the annular groove 32 (the centerline L2) is shifted toward the one side in the axial direction from the middle of the rolling bearing 7 (the centerline L0). Accordingly, the middle of the annular groove 32 can be located in the region which is located on the housing 2 side (outer peripheral side) of the outer ring 12 and which is most elastically deformed (the region where strain is the largest) when the rolling bearing 7 is subjected to a load containing an axial component as well as a large radial load. Creep can thus be efficiently restrained.

Figure 5:
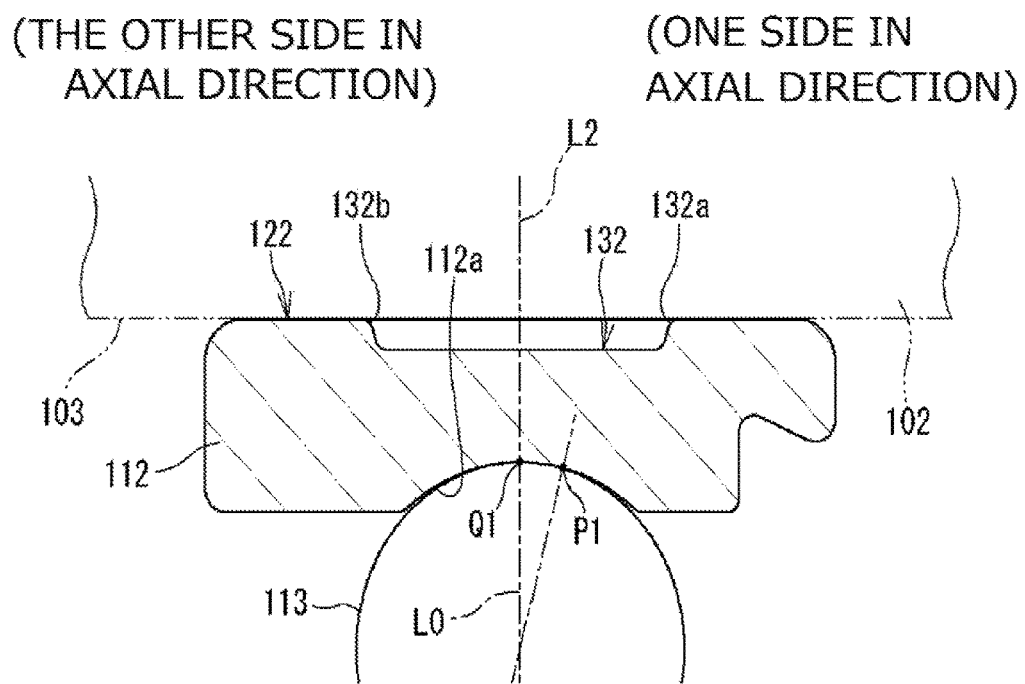
FIG. 5 is a sectional view showing a part of a conventional rolling bearing.
Figure 6:
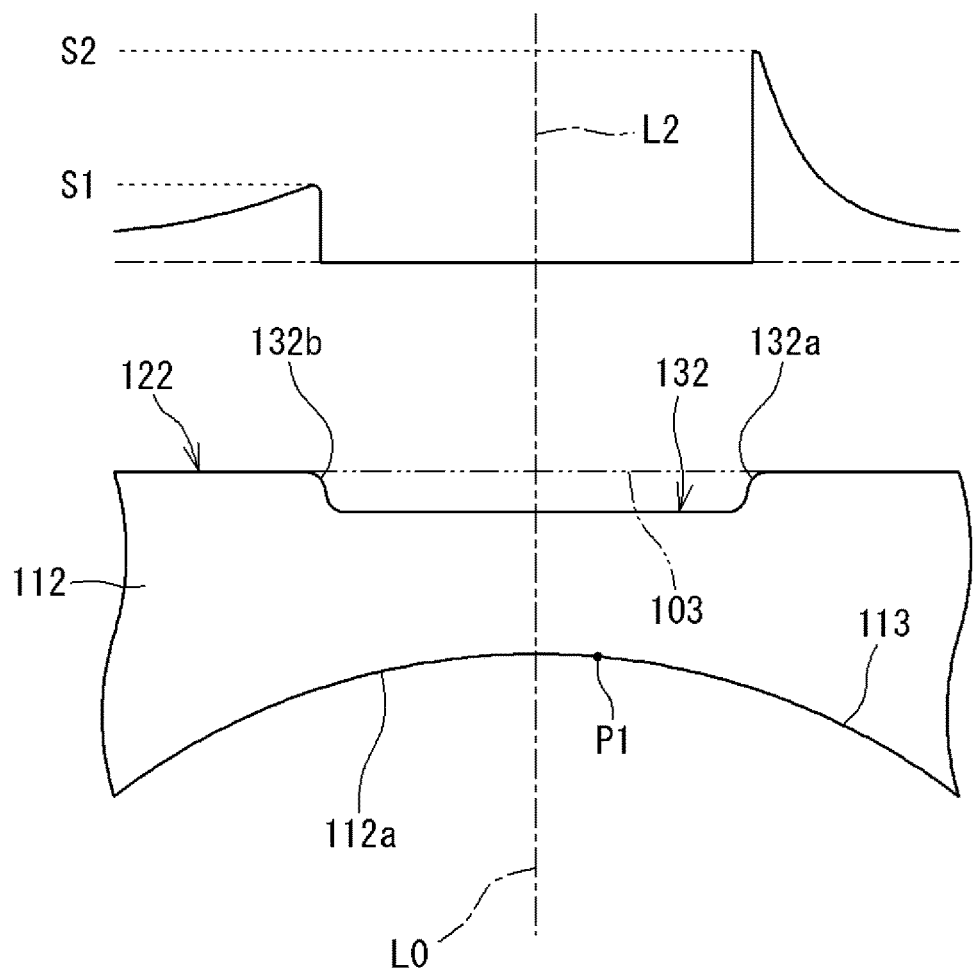
FIG. 6 is an illustration showing distribution of a surface pressure that is applied to a housing inner peripheral surface in the conventional rolling bearing.
Figure 7:
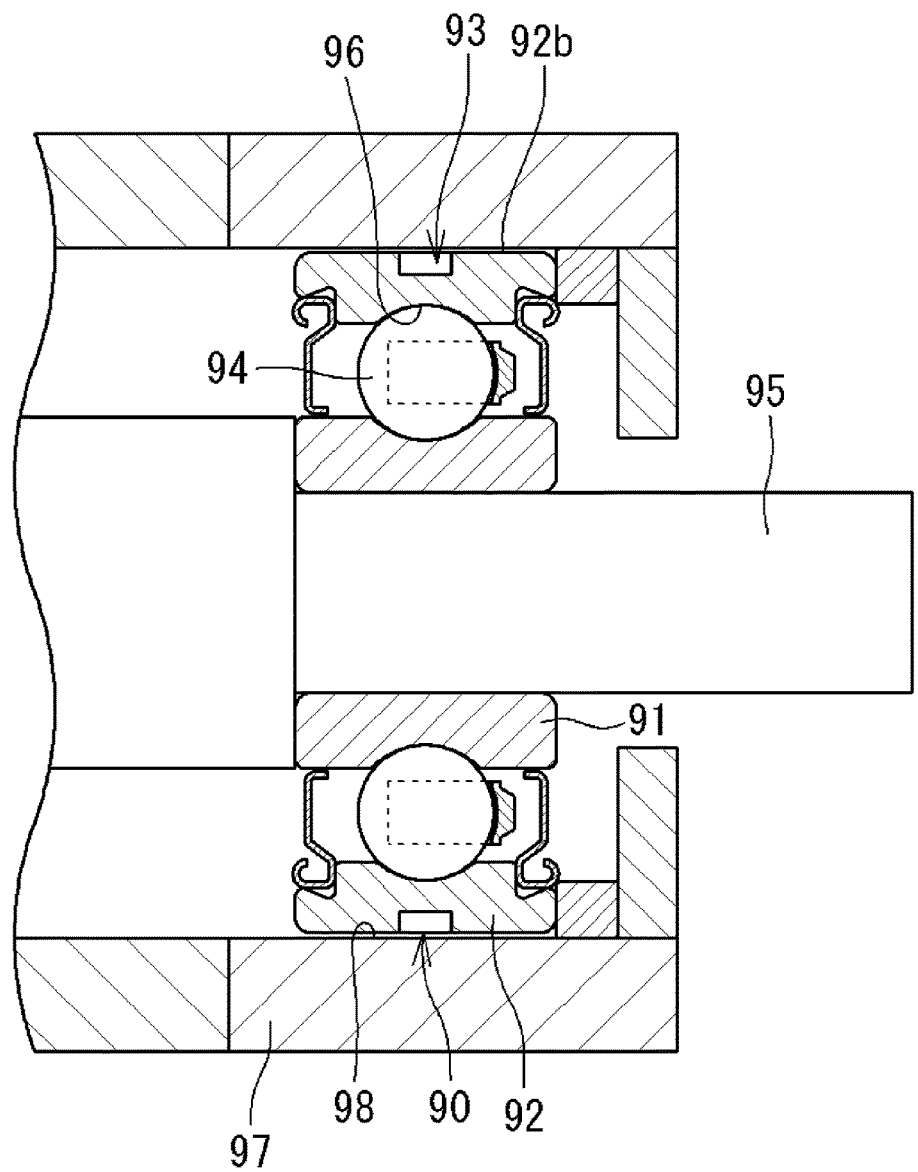
FIG. 7 is a sectional view showing a conventional rolling bearing.

In a conventional example (see FIG. 5), the middle (centerline L2) of an annular groove 132 matches the middle (centerline L0) of a bearing in the axial direction. In this case, when the bearing is subjected to a load containing an axial component as well as a large radial load, a surface pressure (peak surface pressure) that is generated between an edge 132a on one side in the axial direction of the annular groove 132 and a housing 102 may be significantly larger than a surface pressure (peak surface pressure) that is generated between an edge 132b on the other side in the axial direction of the annular groove 132 and the housing 102. This may cause local wear of the housing 102. That is, as shown in FIG. 5, an outer ring 112 is under a combined radial and axial load (as in the embodiment shown in FIG. 1), and a point P1 is a contact point of a ball 113 with an outer ring raceway groove 112a. The point P1 is located at a position shifted toward the one side in the axial direction from the centerline L0 of the outer ring 112. In the conventional example, the centerline L2 of the annular groove 132 matches the centerline L0 of the outer ring 112. In this case, an offset peak surface pressure is generated between a fitting surface 122 of the outer ring 112 and a housing inner peripheral surface 103. This will be further described with reference to FIG. 6. FIG. 6 is an illustration showing distribution of the surface pressure that is applied to the housing inner peripheral surface 103. The contact point of the ball 113 with the outer ring raceway groove 112a (the point P1, i.e., the point at which the outer ring 112 is subjected to the combined radial and axial load) is located closer to the edge 132a on the one side in the axial direction of the annular groove 132 than to the edge 132b on the other side in the axial direction of the annular groove 132. Accordingly, a peak surface pressure S2 that is generated in a contact portion of the edge 132a on the one side in the axial direction of the annular groove 132 with the housing inner peripheral surface 103 is higher than a peak surface pressure S1 that is generated in a contact portion of the edge 132b on the other side in the axial direction of the annular groove 132 with the housing inner peripheral surface 103.

Figure 3:
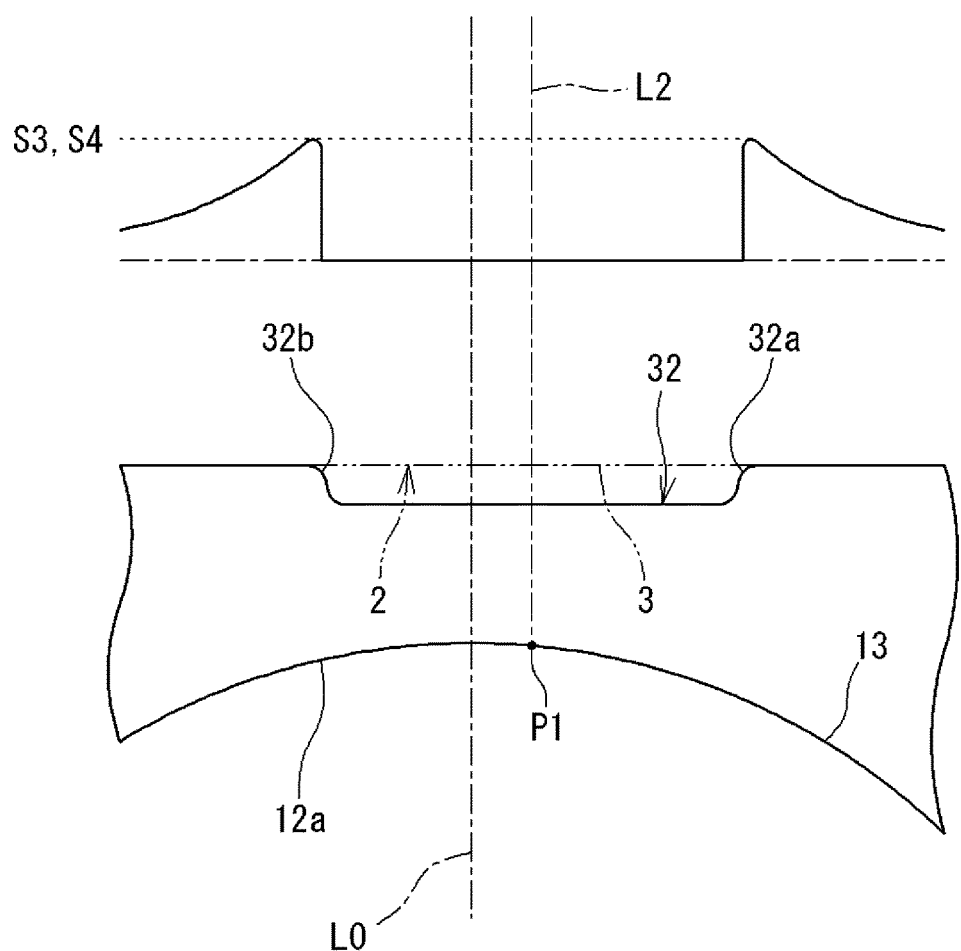
FIG. 3 is an illustration showing distribution of a surface pressure that is applied to a housing inner peripheral surface in the rolling bearing shown in FIG. 1.

In the present embodiment (see FIG. 3), the annular groove 32 is formed so as to be offset toward the one side in the axial direction. The distance from the contact point (P1) of the ball 13 with the outer ring raceway groove 12a to an edge 32a on the one side in the axial direction of the annular groove 32 is (substantially) the same as that from the contact point (P1) of the ball 13 with the outer ring raceway groove 12a to an edge 32b on the other side in the axial direction of the annular groove 32. A peak surface pressure S3 that is generated in a contact portion of the edge 32a on the one side in the axial direction of the annular groove 32 with the housing inner peripheral surface 3 is equal to a peak surface pressure S4 that is generated in a contact portion of the edge 32b on the other side in the axial direction of the annular groove 32 with the housing inner peripheral surface 3. According to the present embodiment, the peak surface pressure that is likely to be higher on the one side in the axial direction (as shown in FIG. 6) is dispersed toward the other side in the axial direction and the maximum value of the surface pressure is lower than that in the conventional example shown in FIG. 6. This can restrain damage such as scratches caused by contact of the outer ring 12 (the edges 32a, 32b of the annular groove 32) with the housing inner peripheral surface 3.

As described above, in the embodiment shown in FIG. 1, the outer ring 12 serving as a stationary ring has the pair of cylindrical outer peripheral surfaces 36a, 37a on both sides in the axial direction of the annular groove 32. These outer peripheral surfaces 36a, 37a are linear (flat) in the axial direction and have different axial dimensions from each other. More specifically, the outer peripheral surface 36a on the one side in the axial direction is a cylindrical surface and has an axial dimension Y1. The outer peripheral surface 37a on the other side in the axial direction is a cylindrical surface and has an axial dimension Y2. The axial dimension Y1 is smaller than the axial dimension Y2 (Y1<Y2). With this configuration, the pair of cylindrical outer peripheral surfaces 36a, 37a function as surfaces that can contact the housing 2. Accordingly, although the annular groove 32 is formed in the outer ring 12, it is ensured that the outer ring 12 has the large fitting surface 22 on the housing 2. For example, fretting wear can be restrained in the case where a radial load that is applied to the rolling bearing 7 is reduced.

Figure 4:
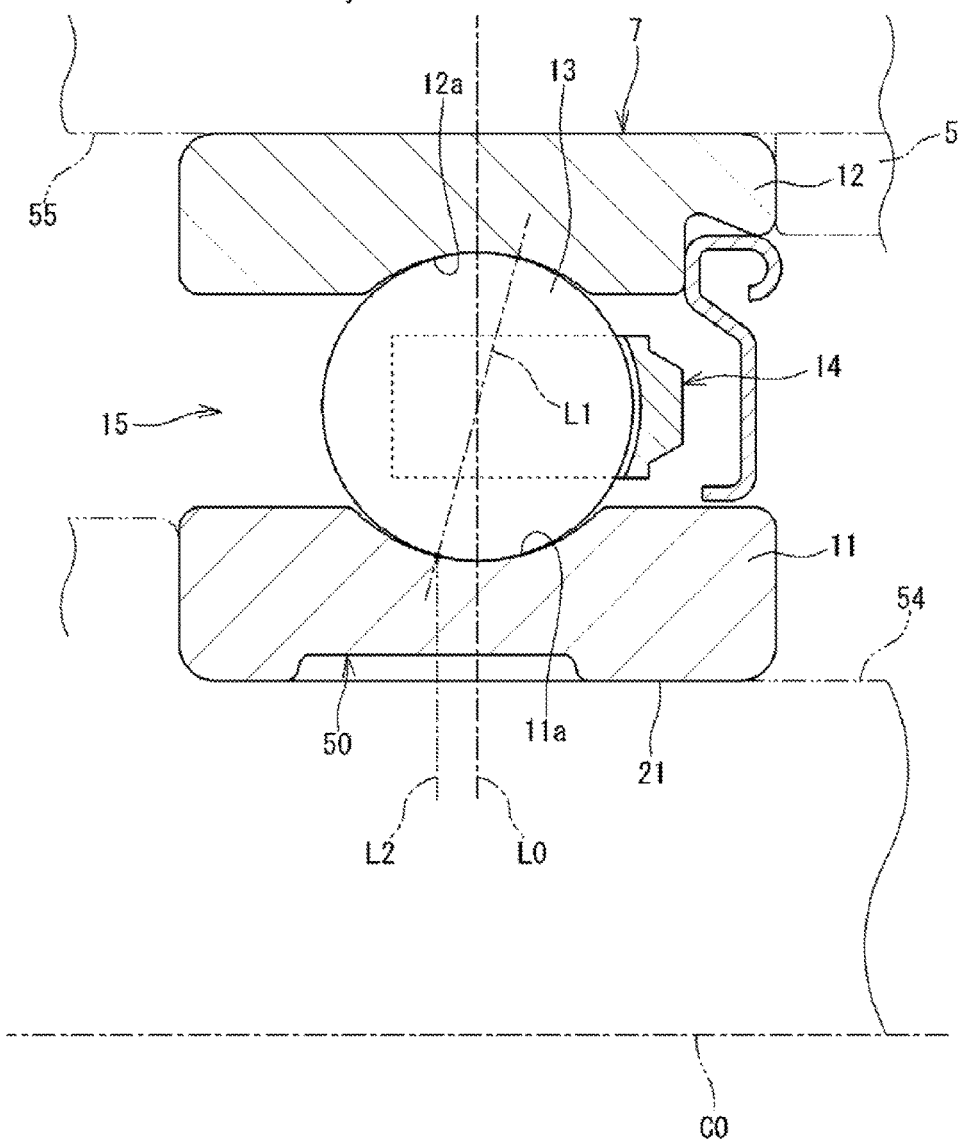
FIG. 4 is a sectional view showing another embodiment of the rolling bearing.

In the embodiment (see FIG. 1), the inner ring 11 is a rotary ring that rotates with the mating member (rotary shaft 4) on which the inner ring 11 is fitted, and the outer ring 12 is a stationary ring that (creeps but) is held stationary with respect to the mating member (housing 2) in which the outer ring 12 is fitted. In the present invention, however, it is only necessary for one of the inner ring 11 and the outer ring 12 to be a rotary ring and the other to be a stationary ring. Unlike the embodiment, as shown in FIG. 4, the inner ring 11 that is fitted on a shaft 54 may be a stationary ring, and the outer ring 12 may be a rotary ring that rotates with a housing 55. In this case, the inner ring 11 is clearance fitted on the shaft 54, and the inner ring 11 creeps on the shaft 54. The inner ring 11 therefore has an annular groove 50 formed in a fitting surface (inner peripheral surface) 21 on the shaft 54 serving as a mating member (as in the embodiment shown in FIG. 1). The annular groove 50 is formed so that the middle (centerline L2) of the annular groove 50 is shifted in the axial direction from the middle (centerline L0) of the rolling bearing 7.

The above embodiments are described with respect to the case where an axial load is constantly applied to the rolling bearing 7, namely with respect to the rolling bearing 7 that is under an axial preload. However, the configuration in which the annular groove 32 (50) is formed in the fitting surface 22 (21) is also applicable to other rolling bearings. For example, in the case where the rotary shaft 4 rotates in one direction, the rolling bearing 7 may be subjected to an axial load from the one side in the axial direction toward the other side in the axial direction during the rotation of the rotary shaft 4. It is also effective to apply the configuration in which the annular groove 32 is formed in the fitting surface 22 to such a rolling bearing 7.

The embodiments disclosed above are by way of example in all respects and should not be construed as a limitation on the scope of the present invention. The rolling bearing 7 of the present invention is not limited to the illustrated embodiments and may be carried out in other forms without departing from the spirit and scope of the present invention. For example, the annular groove 32 may have a shape (sectional shape) other than that shown in the figures. The annular groove 32 is not limited to the rectangular shape and may have a concave arc shape etc.

The rolling bearing is not limited to the deep groove ball bearing and may be an angular contact ball bearing. The rolling elements are not limited to the balls and may be cylindrical rollers or tapered rollers. The rolling bearing of the present invention is applicable to various rotary apparatuses and is particularly preferably applied to rotary apparatuses having the creep problem.

According to the present invention, the middle of the annular groove can be located in the region that is located on the mating member side of the stationary ring and that is most elastically deformed (the region where strain is the largest) when the rolling bearing is subjected to a load containing an axial component as well as a radial load. Creep can thus be effectively restrained.

What is claimed is:

1. A rolling bearing, comprising:
an inner ring;
an outer ring;
a plurality of rolling elements that are interposed between the inner ring and the outer ring; and
a cage that holds the plurality of rolling elements, wherein:
one of the inner ring and the outer ring is a rotary ring and the other is a stationary ring,
a fitting surface of the stationary ring fitted to a mating member is formed in first and second partial peripheral surfaces of a radially outer surface of the stationary ring that faces the mating member, the first partial peripheral surface being formed on one side in an axial direction and the second partial peripheral surface being formed on the other side in the axial direction with respect to the first partial peripheral surface,
an annular groove that restrains creep is formed between the first partial peripheral surface and the second partial peripheral surface, and
a groove center of the annular groove is disposed laterally of a center of the rolling bearing in the axial direction.

2. The rolling bearing according to claim 1, wherein
the rolling bearing is a rolling bearing that is under an axial preload when in use as an axial load from the one side in the axial direction toward the other side in the axial direction is applied to the stationary ring.

3. The rolling bearing according to claim 2, wherein
the stationary ring has a pair of cylindrical outer peripheral surfaces on both sides in the axial direction of the annular groove, and the pair of cylindrical outer peripheral surfaces are linear in the axial direction and have different axial dimensions from each other.

4. The rolling bearing according to claim 1, wherein
the stationary ring has a pair of cylindrical outer peripheral surfaces on both sides in the axial direction of the annular groove, and the pair of cylindrical outer peripheral surfaces are linear in the axial direction and have different axial dimensions from each other.

* * * * *